US007325166B2

(12) United States Patent
Maguire

(10) Patent No.: US 7,325,166 B2
(45) Date of Patent: Jan. 29, 2008

(54) HIERARCHICAL CATEGORIZATION OF CUSTOMER ERROR REPORTS

(75) Inventor: Robert Evon Maguire, Sausalito, CA (US)

(73) Assignee: Autodesk, Inc., San Rafael, CA (US)

( * ) Notice: Subject to any disclaimer, the term of this patent is extended or adjusted under 35 U.S.C. 154(b) by 629 days.

(21) Appl. No.: 10/874,736

(22) Filed: Jun. 23, 2004

(65) Prior Publication Data

US 2005/0289404 A1 Dec. 29, 2005

(51) Int. Cl.
*G06F 11/00* (2006.01)
(52) U.S. Cl. .............................. 714/38; 714/48; 714/57
(58) Field of Classification Search ................ 714/57, 714/48, 38, 26; 717/128
See application file for complete search history.

(56) References Cited

U.S. PATENT DOCUMENTS

| 5,928,369 | A  | * | 7/1999  | Keyser et al. .................. 714/47 |
| 6,708,333 | B1 | * | 3/2004  | Glerum et al. ............... 717/171 |
| 6,785,848 | B1 | * | 8/2004  | Glerum et al. ................. 714/38 |
| 7,039,833 | B2 | * | 5/2006  | Knuutila et al. ............... 714/38 |
| 7,120,901 | B2 | * | 10/2006 | Ferri et al. .................... 717/128 |

\* cited by examiner

*Primary Examiner*—Marc Duncan
(74) *Attorney, Agent, or Firm*—Gates & Cooper LLP

(57) ABSTRACT

A method, apparatus and article of manufacture for prioritizing customer error reports for a software application. A sub-bucketing algorithm is performed in a computer to sort stack traces associated with the customer error reports by a plurality of lines or entries in the stack traces, in order to create a hierarchy for categorization of the customer error reports.

27 Claims, 4 Drawing Sheets

| Index | Module | Object | Function | Offset | Source File |
|---|---|---|---|---|---|
| 0 | acad | SSet | next | 0x53 | sellist.cpp, line 1334 |
| 1 | acad | AcEdImpSelectionSetService | setSelectionSet | 0x97 | acedinptimp.cpp, line 2180+0x11 |
| 2 | acad | AcEdImpInputPointManager | sendSsgetAddFailedNotification | 0x69 | acedinptimp.cpp, line 1884 |
| 3 | acad | AcQueryEntity | DoPickSub | 0x407 | acqueryentity.cpp, line 703 |
| 4 | acad | AcQueryEntity | DoPickEx | 0x52 | acqueryentity.cpp, line 492+0x16 |
| 5 | acad | AcQueryEntity | DoPick | 0x14 | acqueryentity.h, line 571 |
| 6 | acad | AcEntitySelector | DoQuery | 0x259 | acentityselector.h, line 412 |
| 7 | acad | null | rxNEntSelCommon | 0xD4 | bagent.cpp, line 390+0x1C |
| 8 | acad | null | rxNEntSelP | 0x104 | bagent.cpp, line 526 |
| 9 | acad | null | acedNEntSelP | 0x118 | adsrx.cpp, line 4864+0x29 |
| 10 | AcEAttedit | null | null | 0x2057 | null |
| 11 | none | null | null | none | null |

*FIG. 2*

HIERARCHICAL CATEGORIZATION OF CUSTOMER ERROR REPORTS

BACKGROUND OF THE INVENTION

1. Field of the Invention

The present invention generally relates to a system for diagnosing program failure, and, in particular, to a hierarchical categorization of customer error reports.

2. Description of the Related Art

Software programs often fail by "crashing" or reaching error conditions that cause them to terminate. In order to improve product quality, it is important to diagnose the reasons for failure.

Operating systems often generate crash data for software programs, wherein the crash data can be analyzed in an attempt to diagnose the reasons for failure. For example, MICROSOFT WINDOWS operating systems create a "full dump" or "minidump" file, and UNIX or LINUX operating systems create a "core dump" file, when a program terminates due to unhandled error conditions.

It is well known for software program vendors to provide users with a set of tools for capturing and analyzing program crash data. In their simplest form, these tools comprise an error reporting mechanism that presents the users with an alert message that notifies them when a failure occurs and provides an opportunity to forward crash data, known as a Customer Error Report (CER), to the vendor for further analysis. The vendor can then use the forwarded crash data to troubleshoot problems, ultimately leading to more robust and crash-resistant programs.

Part of the data collected about a particular crash is the application's stack trace, which is comprised of a sequential ordering of modules, objects, functions and offsets, starting from the operating system, and extending to an offset into a function of an object of a module of the application where the failure occurred. This can correspond directly to a line number in a source code file, if all necessary information is available for that crash data.

Often, a large number of CERs are collected by a vendor. To expedite the prioritization of resources in resolving the CERs, vendors usually sort the stack traces by the top line of the stack, which indicates the module, object, function and offset at which the failure occurred. This means that two or more CERs from two or more different customers that have the same top level modules, objects, functions and offsets would be categorized as belonging to the same group or "bucket" of failures (the process for sorting CERs is also referred to as a "bucketing algorithm").

An unfortunate side effect of this bucketing algorithm is that two CERs that are generated from two different failures may be categorized as belonging to the same bucket because they had identical top lines of their stack traces. This was usually the symptom of different failures being directed into the same error handler. The error handler would display itself on the top line of the stack and the true source of the failure would be hidden in lower lines or entries of the stack trace.

Consequently, there is a need in the art for a mechanism where the information to help diagnose failures can be intelligently supplied from lower lines or entries of the stack trace. Specifically, there is a need in the art for a sub-bucketing algorithm that uses additional information from the stack trace to help identify the failures associated with customer error reports.

SUMMARY OF THE INVENTION

To address the requirements described above, the present invention discloses a method, apparatus, and article of manufacture for prioritizing customer error reports for a software application. A sub-bucketing algorithm is performed in a computer to sort stack traces associated with the customer error reports by a plurality of lines or entries in the stack traces, in order to create a hierarchy for categorization of the customer error reports.

BRIEF DESCRIPTION OF THE DRAWINGS

Referring now to the drawings in which like reference numbers represent corresponding parts throughout:

FIG. 2 illustrates an example stack trace provided in conjunction with a customer error report according to the preferred embodiment of the present invention;

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

The present invention describes a hierarchical categorization of Customer Error Reports (CERs), known as "sub-bucketing." Sub-bucketing allows developers to apply variable stack trace depth bucketing (more than just one level of the stack trace) in order to separate crash data resulting from different failures. Consequently, sub-bucketing comprises an intelligent aggregation of large volumes of crash data sorted by a user-configurable, variable-depth, hierarchical representation of similar stack traces for easier failure prioritization analysis.

Hardware and Software Environment

Figure 1:
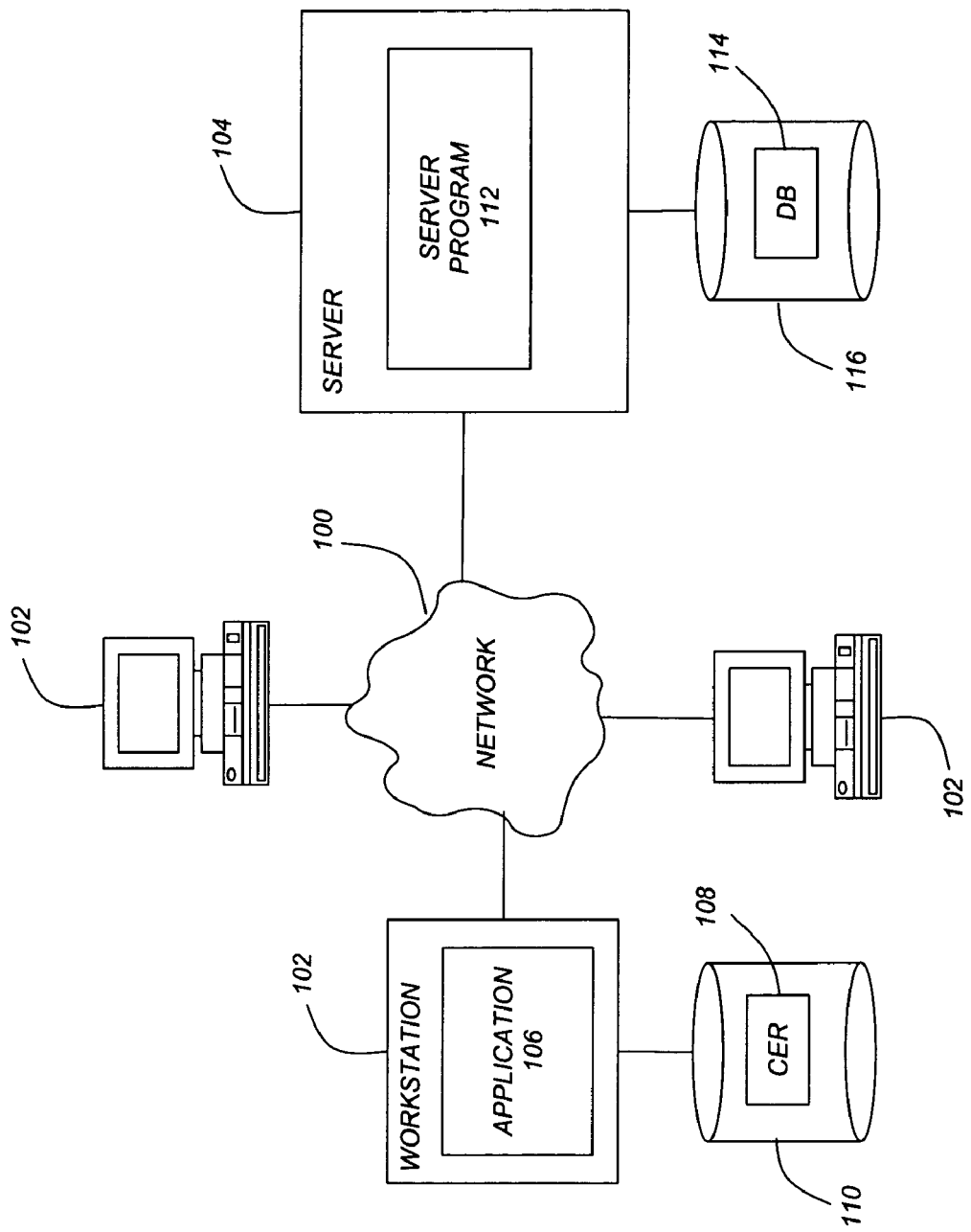
FIG. 1 schematically illustrates an exemplary hardware and software environment used in the preferred embodiment of the present invention.

FIG. 1 schematically illustrates an exemplary hardware and software environment used in the preferred embodiment of the present invention. The present invention is usually implemented using a network 100 to connect one or more workstations 102 to one or more server computers 104. A typical combination of resources may include workstations 102 that comprise personal computers, network computers, etc., and server computers 104 that comprise personal computers, network computers, workstations, minicomputers, mainframes, etc. The network 100 coupling these computers 102 and 104 may comprise a LAN, WAN, Internet, etc.

Generally, the present invention is implemented using one or more programs, files and/or databases that are executed and/or interpreted by the workstations 102. In the exemplary embodiment of FIG. 1, these programs and databases include one or more applications 106 executed by one or more of the workstations 102, and one or more customer error reports (CERs) 108 stored on a data storage device 110 accessible from the workstation 102. In addition, the environment often includes one or more server programs 112 executed by the server computer 104, and a database 114 stored on a data storage device 116 accessible from the server computer 104 that collects the CERs 108.

To expedite the prioritization of resources in resolving the CERs 108 collected in the database 114, the server program 112 performs a sub-bucketing algorithm to sort stack traces associated with the CERs 108 by a plurality of lines or entries in the stack traces, in order to create a hierarchy for categorization of the CERs 108. Each of the lines or entries in the stack traces indicate a point of execution within the application 106, wherein the point of execution is represented by a module, object, function and offset within the application 106. A top line or entry in the stack trace indicates a point of execution within the application 106 where a failure occurred, while progressively lower lines or entries in the stack traces each indicate progressively earlier points of execution of the application 106 before the failure occurred.

When a CER 108 is generated, it does not contain a human-readable version of its stack trace. To read the stack trace, the CER 108 must undergo a process of symbol resolution, which uses Product DataBase (PDB) files and binary files (executables and dynamically linked libraries) that were created at compile time. Those skilled in the art are well versed in this process.

The hierarchy for categorization of the CERs 108 comprises a hierarchy of buckets for the stack traces, wherein the hierarchy of buckets for the stack traces comprises a tree-like structure that allows developers to separate out the different CERs 108. The sub-bucketing algorithm categorizes CERs 108 from similar failures into the hierarchy in a similar manner, and the sub-bucketing algorithm categorizes CERs 108 from different failures into the hierarchy in a different manner. Thus, the sub-bucketing algorithm increases a likelihood that two different failures will not be categorized into the hierarchy in a similar manner because they have identical top lines or entries of their stack traces, and instead will be categorized into the hierarchy in a different manner because they have different lower level lines or entries of their stack traces.

Each of the programs and/or databases comprise instructions and data which, when read, interpreted, and executed by their respective computers, cause the computers to perform the steps necessary to execute the steps or elements of the present invention. The programs and databases are usually embodied in or readable from a computer-readable device, medium, or carrier, e.g., a local or remote data storage device or memory device coupled to the computer directly or coupled to the computer via a data communications device.

Thus, the present invention may be implemented as a method, apparatus, or article of manufacture using standard programming and/or engineering techniques to produce software, firmware, hardware, or any combination thereof. The term "article of manufacture" (or alternatively, "computer program carrier or product") as used herein is intended to encompass one or more programs and/or databases accessible from any device, carrier, or media.

Of course, those skilled in the art will recognize that the exemplary environment illustrated in FIG. 1 is not intended to limit the present invention. Indeed, those skilled in the art will recognize that other alternative environments may be used without departing from the scope of the present invention.

OPERATION OF THE PRESENT INVENTION

In the present invention, to expedite the prioritization of resources in resolving CERs 108 collected in the database 114, the server program 112 sorts the stack traces present in the CERs 108 by a plurality of lines or entries of the stack trace, in order to create a hierarchy of modules, objects, functions and offsets representative of the state of the application 106 at the time a failure occurred. Consequently, CERs 108 from different customers resulting from different failures will likely be categorized differently.

FIG. 2 illustrates an example stack trace provided in conjunction with a CER 108. In the example stack trace, there are index, module, object, function, offset and source file columns, as well as multiple rows each representing the execution of the application 106 located at a particular module, object, function and offset. The top line or entry indicates the last point of execution of the application 106 before the crash, while progressively lower lines or entries each indicate progressively earlier points of execution of the application 106 before the crash.

The top entry (index 0) of the example stack trace of FIG. 2 indicates that an error occurred in the "acad" module, in the "SSet" object, in the "next" function, at an offset of "0×53" (in hexadecimal) bytes. This corresponds to "line 1334" of the source code file "sellist.cpp." A developer should be able to look at this stack trace and determine the source of the failure (although the stack trace might only indicate a surface level problem, and the real problem could be much harder to find, such as an uninitialized variable many levels down).

The vendor may collect thousands or millions of these CERs 108 in the database 114, which means that it is not feasible to have a developer look at each of these CERs 108. In other words, the CERs 108 must be prioritized. It is standard in the industry to sort these CERs 108 by the top line of the stack trace (i.e. index=0, module, object, function and offset) and categorize common CERs 108 as being in a common "bucket" that corresponds to the top line of the stack trace. By sheer numbers, the buckets that have the most CERs 108 in them are the ones that get the most attention from developers. In this way, developers can focus their time on the failures that confront their customers most often, with tangible statistical evidence to support those assumptions.

However, this solution works best when there is bucket-to-failure ratio of 1-to-1. If different failures are categorized in the same bucket, it is difficult to prioritize the CERs 108 correctly, because developers do not know what percentage of the CERs 108 in a bucket resulted from each failure. Upon further analysis, it is possible to determine which CERs 108 are the result of each failure by sorting by more than just the top level of the stack, i.e., by sub-bucketing.

Figure 3A:
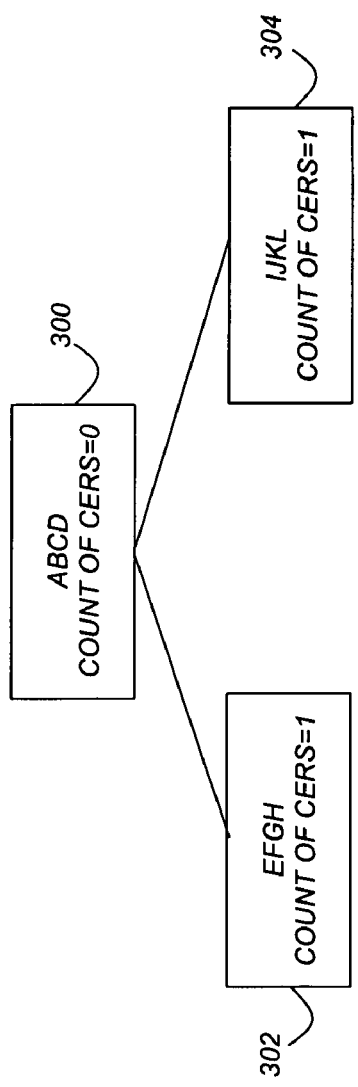
FIGS. 3A and 3B illustrate a hierarchy of buckets formed from stack traces according to the preferred embodiment of the present invention.
Figure 3B:
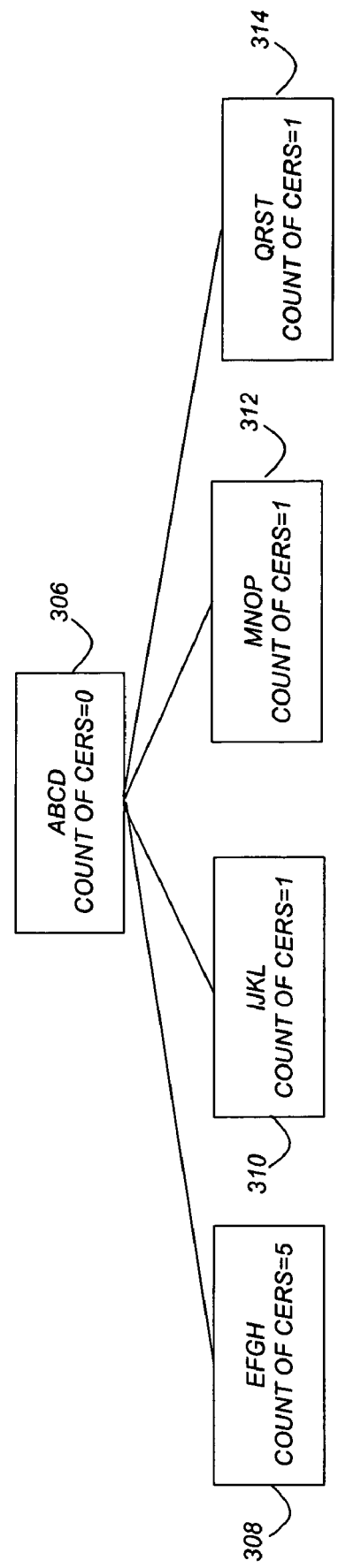

Consider the sub-bucketing operation illustrated in FIGS. 3A and 3B. Assume that a vendor receives two different CERs 108, both of which have a top line in the stack trace represented as "ABCD," where the module is "A", the object is "B", the function is "C" and the offset is "D." This would mean that there is one bucket for "ABCD" that has two CERs 108 in it. One of the CERs 108 has a second line in the stack trace represented as "EFGH," where the module is "E", the object is "F", the function is "G" and the offset is "H" and the other CER 108 has a second line in the stack trace represented as "IJKL," where the module is "I", the object is "J", the function is "K" and the offset is "L" If a sub-bucket operation is performed on bucket "ABCD", then two new sub-buckets would be formed, "ABCD/EFGH" and "ABCD/IJKL," and each of the CERs 108 in the "ABCD" bucket would be assigned to their respective sub-buckets. This would make the count of CERs 108 in bucket "ABCD"=0, and the counts of CERs 108 in bucket "ABCD/EFGH"=1 and bucket "ABCD/IJKL"=1, as represented by blocks 300, 302 and 304 in FIG. 3A.

Consequently, a hierarchy of buckets is formed from the sub-bucketing of stack traces. This hierarchy of buckets comprises a tree-like structure that allows developers to separate out the different failures among the CERs 108.

Complicating the example slightly in FIG. 3B, assume that there were 8 CERs 108 in the example, of the following form:

ABCD/EFGH=5 CERs
ABCD/IJKL=1 CER
ABCD/MNOP=1 CER
ABCD/QRST=1 CER

Before sub-bucketing, the count of CERs 108 in bucket "ABCD"=8. After sub-bucketing, the counts of CERs 108 in bucket "ABCD/EFGH"=5, bucket "ABCD/IJKL"=1, bucket "ABCD/MNOP"=1 and bucket "ABCD/QRST"=1, as represented by blocks 306, 308, 310, 312 and 314 in FIG. 3B.

In FIG. 3B, it can be seen that "ABCD/EFGH" has the most failures, because it has five identical CERs 108, while the other three CERs 108 at the same level in the hierarchy are not really related to this failure, or each other, and are statistically insignificant compared to the "ABCD/EFGH" bucket. Moreover, the top level "ABCD" bucket has a CER 108 count of 0, which means that it is also statistically insignificant.

In order to perform sub-bucketing, two attributes are associated with each bucket: a reference to a "parent" bucket and a "has children" flag. These attributes are used and modified by the sub-bucketing algorithm to locate a proper bucket for each CER 108. In the previous example, the act of sub-bucketing "ABCD" would set its "has children" flag to true and would set its "parent" bucket (as with all top level buckets) to null. When an attempt is made to categorize a CER 108 with a stack trace represented by "ABCD/EFGH" the sub-bucketing algorithm finds the bucket "ABCD," determines that the bucket "ABCD" "has children," and thus examines the stack trace to determine that the next line or entry is "EFGH." Since no bucket exists for "EFGH" with a "parent" reference to "ABCD," the sub-bucketing algorithm creates a bucket for "EFGH," sets the "has children" to false, and sets the "parent" to "ABCD." The next "ABCD/EFGH" CER 108 processed will follow the same logic to place the CER 108 in the "ABCD/EFGH" bucket and increment the count associated with "ABCD/EFGH."

It is possible to have CERs 108 that have shorter stack traces than the depth of the sub-buckets that would contain them In this case, the CERs 108 are associated with the parent directly, even though it has a "has children" flag set to true. For example, if there is an additional CER that only had a stack trace of "ABCD" and nothing else, it would be associated with bucket "ABCD" 306, regardless of its "has children" flag.

Stack traces that are larger than the sub-bucket depth are sorted just like the error reports in FIG. 3B. For example, if a new CER 108 was received that had a stack trace of "ABCD/EFGH/ZXCV," it would land in bucket "ABCD/EFGH" 308, and the last line in the stack trace of the new CER would be ignored.

Figure 4:
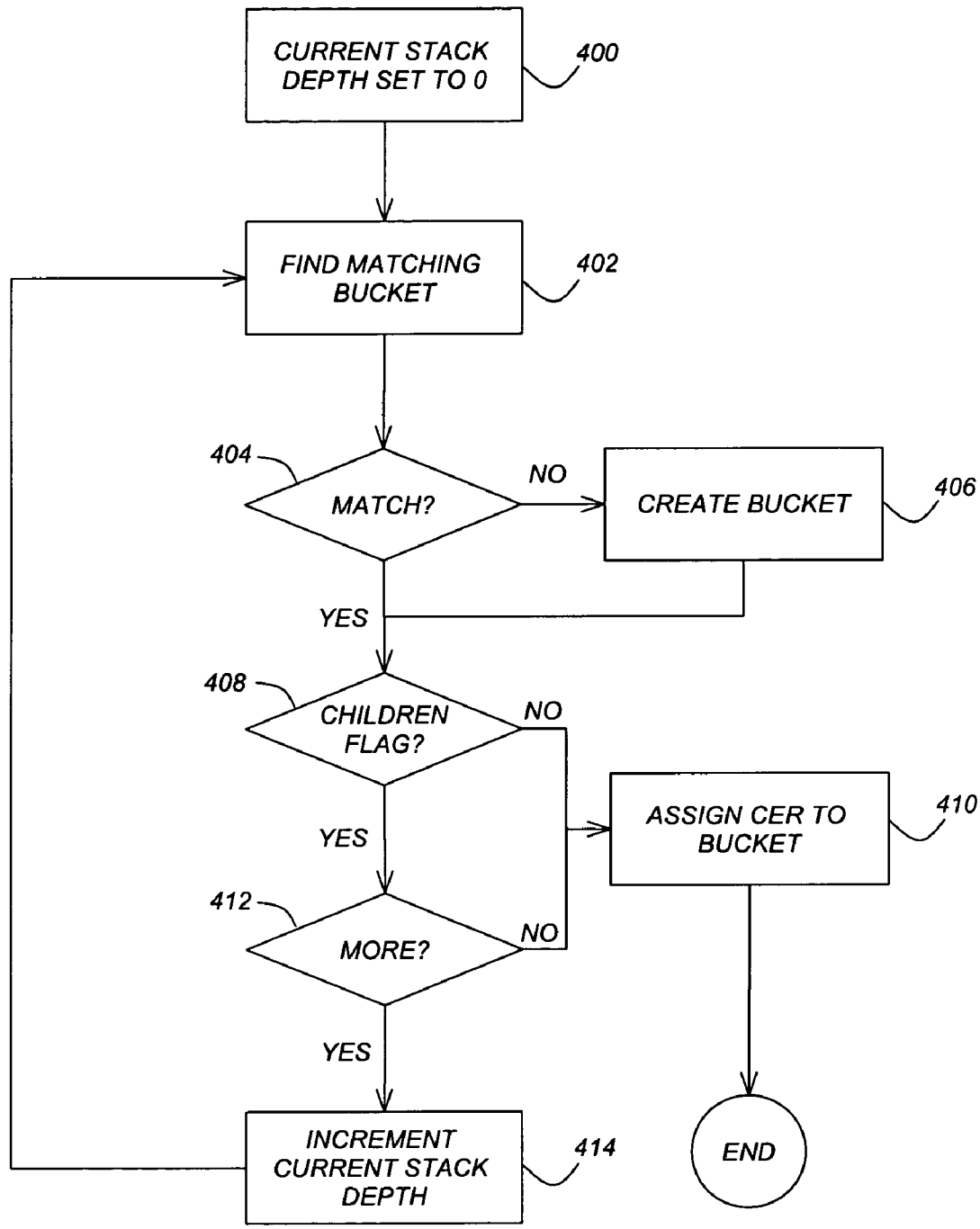
FIG. 4 is a flowchart that further illustrates the sub-bucketing algorithm according to a preferred embodiment of the present invention.

FIG. 4 is a flowchart that further illustrates the sub-bucketing algorithm performed by the server program 112 according to a preferred embodiment of the present invention. Those skilled in the art will recognize that different logic may be used without departing from the scope of the present invention.

Block 400 represents a CURRENT_STACK_DEPTH being set to 0. Thereafter, control transfers to Block 402.

Block 402 represents finding a matching bucket. This block finds a bucket having a module, object, function and offset that matches the stack trace, at a depth or entry that matches the CURRENT_STACK_DEPTH, where the bucket has a parent reference to the previous bucket (when the CURRENT_STACK_DEPTH is not 0). Thereafter, control transfers to Block 404.

Block 404 is a decision block that determines whether a matching bucket was found. If not, control transfers to Block 406; otherwise, the matching bucket becomes the current bucket and control transfers to Block 408.

Block 406 represents a bucket being created, when a match was not found, wherein the created bucket is identified as the current bucket. If the CURRENT_STACK_DEPTH is 0, then the "parent" is set to null; otherwise, the "parent" is set to the previous bucket. In both instances, "has children" is set to false. Thereafter, control transfers to Block 408.

Block 408 is a decision block that determines whether the current bucket has its "has children" flag set to true. If not, control transfers to Block 410; otherwise, control transfers to Block 412.

Block 410 represents the CER 108 being assigned to the current bucket. Thereafter, the logic terminates.

Block 412 is a decision block that determines if the current CER has any more remaining stack entries. If not, control transfers to block 410; otherwise, control transfers to Block 414.

Block 414 represents the CURRENT_STACK_DEPTH being incremented. Thereafter, control transfers to Block 402.

This logic is to be applied to all CERs 108 as they are received; however, when any user initiates a sub-bucketing request (i.e., changes the "has children" flag), all reports in that bucket and all children buckets will need to have the bucketing algorithm re-applied to them. This will ensure that all previous reports and all new reports will be, and have been, sorted in exactly the same fashion.

CONCLUSION

This concludes the description of the preferred embodiment of the invention. The following describes some alternative embodiments for accomplishing the present invention.

For example, any type of computer, such as a mainframe, minicomputer, work station or personal computer, or network could be used with the present invention. In addition, any program, application or operating system could benefit from the present invention. It should also be noted that the specific programs described herein are not intended to limit the invention, but merely to provide examples.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for prioritizing customer error reports for a software application, comprising:
   (a) performing a sub-bucketing algorithm in a computer to sort stack traces associated with the customer error reports by more than one line or entry in each of the stack traces, in order to create a hierarchy for categorization of the customer error reports.

2. The method of claim 1, wherein each of the lines or entries in the stack traces indicate a point of execution within the application, wherein the point of execution is represented by a module, object, function and offset within the application.

3. The method of claim 2, wherein a top line or entry in the stack trace indicates a point of execution within the application where a failure occurred.

4. The method of claim 3, wherein progressively lower lines or entries in the stack traces each indicate progressively earlier points of execution of the application before the failure occurred.

5. The method of claim 1, wherein the sub-bucketing algorithm categorizes customer error reports from similar failures into the hierarchy in a similar manner.

6. The method of claim 1, wherein the sub-bucketing algorithm categorizes customer error reports from different failures into the hierarchy in a different manner.

7. The method of claim 1, wherein the sub-bucketing algorithm increases a likelihood that two different failures will not be categorized into the hierarchy in a similar manner because they have identical top lines or entries of their stack traces, and instead will be categorized into the hierarchy in a different manner because they have different lower level lines or entries of their stack traces.

8. The method of claim 1, wherein the hierarchy for categorization of the customer error reports comprises a hierarchy of buckets for the stack traces.

9. The method of claim 8, wherein the hierarchy of buckets for the stack traces comprises a tree-like structure that allows developers to separate out the different customer error reports.

10. An apparatus for prioritizing customer error reports for a software application, comprising:
    (a) a computer, and
    (b) logic, performed by the computer, for performing a sub-bucketing algorithm to sort stack traces associated with the customer error reports by more than one line or entry in each of the stack traces, in order to create a hierarchy for categorization of the customer error reports.

11. The apparatus of claim 10, wherein each of the lines or entries in the stack traces indicate a point of execution within the application, wherein the point of execution is represented by a module, object, function and offset within the application.

12. The apparatus of claim 11, wherein a top line or entry in the stack trace indicates a point of execution within the application where a failure occurred.

13. The apparatus of claim 12, wherein progressively lower lines or entries in the stack traces each indicate progressively earlier points of execution of the application before the failure occurred.

14. The apparatus of claim 10, wherein the sub-bucketing algorithm categorizes customer error reports from similar failures into the hierarchy in a similar manner.

15. The apparatus of claim 10, wherein the sub-bucketing algorithm categorizes customer error reports from different failures into the hierarchy in a different manner.

16. The apparatus of claim 10, wherein the sub-bucketing algorithm increases a likelihood that two different failures will not be categorized into the hierarchy in a similar manner because they have identical top lines or entries of their stack traces, and instead will be categorized into the hierarchy in a different manner because they have different lower level lines or entries of their stack traces.

17. The apparatus of claim 10, wherein the hierarchy for categorization of the customer error reports comprises a hierarchy of buckets for the stack traces.

18. The apparatus of claim 17, wherein the hierarchy of buckets for the stack traces comprises a tree-like structure that allows developers to separate out the different customer error reports.

19. An article of manufacture comprising a computer-readable storage device for storing instructions that when read and executed by a computer, cause the computer to perform a method for prioritizing customer error reports for a software application, the method comprising:
    (a) performing a sub-bucketing algorithm in a computer to sort stack traces associated with the customer error reports by more than one line or entry in each of the stack traces, in order to create a hierarchy for categorization of the customer error reports.

20. The article of claim 19, wherein each of the lines or entries in the stack traces indicate a point of execution within the application, wherein the point of execution is represented by a module, object, function and offset within the application.

21. The article of claim 20, wherein a top line or entry in the stack trace indicates a point of execution within the application where a failure occurred.

22. The article of claim 21, wherein progressively lower lines or entries in the stack traces each indicate progressively earlier points of execution of the application before the failure occurred.

23. The article of claim 19, wherein the sub-bucketing algorithm categorizes customer error reports from similar failures into the hierarchy in a similar manner.

24. The article of claim 19, wherein the sub-bucketing algorithm categorizes customer error reports from different failures into the hierarchy in a different manner.

25. The article of claim 19, wherein the sub-bucketing algorithm increases a likelihood that two different failures will not be categorized into the hierarchy in a similar manner because they have identical top lines or entries of their stack traces, and instead will be categorized into the hierarchy in a different manner because they have different lower level lines or entries of their stack traces.

26. The article of claim 19, wherein the hierarchy for categorization of the customer error reports comprises a hierarchy of buckets for the stack traces.

27. The article of claim 26, wherein the hierarchy of buckets for the stack traces comprises a tree-like structure that allows developers to separate out the different customer error reports.

* * * * *